UNITED STATES PATENT OFFICE.

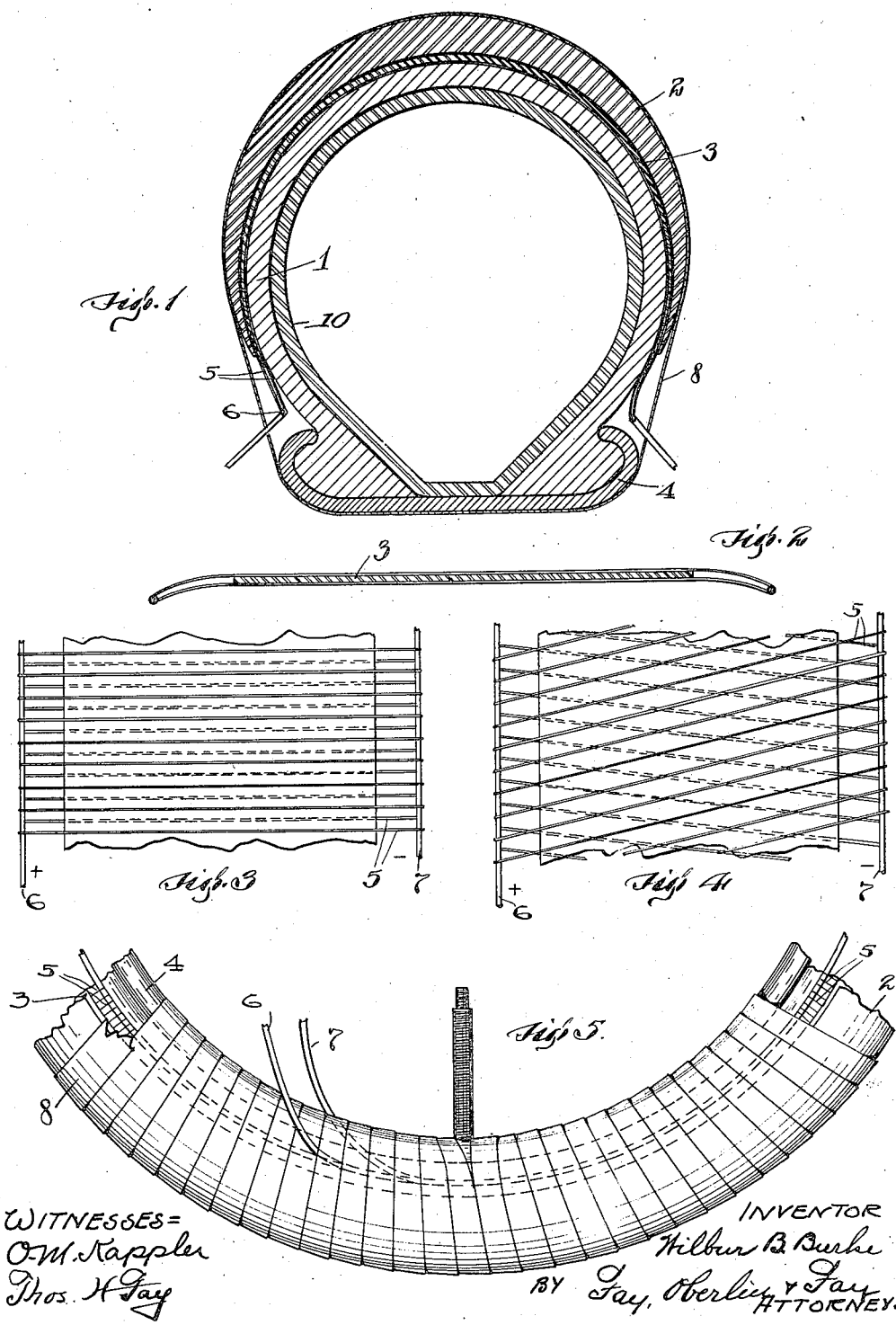

WILBUR B. BURKE, OF CLEVELAND, OHIO, ASSIGNOR TO THE BURKE PROCESS COMPANY, OF CLEVELAND, OHIO, A CORPORATION OF OHIO.

METHOD OF VULCANIZING RUBBER.

1,216,654.  Specification of Letters Patent.  Patented Feb. 20, 1917.

Application filed February 16, 1916. Serial No. 78,572.

*To all whom it may concern:*

Be it known that I, WILBUR B. BURKE, a citizen of the United States, and a resident of Cleveland, county of Cuyahoga and State of Ohio, have invented a new and useful Improvement in Methods of Vulcanizing Rubber, of which the following is a specification, the principle of the invention being herein explained and the best mode in which I have contemplated applying that principle, so as to distinguish it from other inventions.

In the present commercial method of vulcanizing rubber, as is well known, the necessary temperature is generally produced by subjecting the article to the influence of steam. In other words, the heat is first applied to the exterior of the article, gradually permeating its inner parts. This is equally true in minor vulcanizing operations, as in repair jobs on tires, where the heat is produced by burning gasolene or some other combustible on a metal plate applied to the article to be vulcanized; in other words, heat obviously is externally applied to such article.

The difficulty in securing a uniform degree of vulcanization or of hardness, especially in articles of appreciable thickness, such as tire casings and the like, has long been realized, and perhaps in no connection more acutely than in the operation of retreading worn tire casings. In such retreading operation, as need only be briefly explained, a fresh tread requires to be vulcanized onto the old casing, a thin layer of gum rubber being interposed between the two, and the whole then subjected to pressure and heat so as to unite the new tread with such old casing. In this operation, however, not only is it difficult to uniformly vulcanize all portions of the interposed layer of fresh gum, but in vulcanizing such layer the old casing and newly applied tread must obviously be overcured so as to materially affect the wearing quality of both.

The object of the present invention, accordingly, is to provide an improved method and means for use therein, whereby, under circumstances such as just explained, a uniform degree of vulcanization may be secured throughout the article being treated, and whereby, furthermore, such vulcanization can be localized, as in the retreading operation described, so as not to affect deleteriously the parts which do not require to be vulcanized. It is not intended of course to imply any limitation in the application of the invention to this particular use, although specific reference will be made thereto by way of illustration in the following description as well as in the claims. It should also be explained that the apparatus aspect of the invention forms the subject matter of a separate, divisional application, filed January 10, 1917, Serial No. 141,570.

The annexed drawings and the following description set forth in detail certain structure adapted for the carrying on of my present improved method, such disclosed means illustrating, however, but one of various ways in which the principle of the invention may be used.

In said annexed drawings:—

Figure 1 is a cross-sectional view of a worn tire casing arranged for the application of a new tread thereto in accordance with my present improved method and apparatus; Fig. 2 is a cross-sectional view on an enlarged scale of the intermediate layer of fresh rubber interposed between such worn casing and the new tread; Fig. 3 is a plan view of a section of such sheet of rubber showing the disposition of certain electric resistance heating elements with relation thereto; Fig. 4 is a view similar to Fig. 3, but showing a modification in the arrangement of such heating elements; and Fig. 5 is a side elevational view of the complete casing as prepared for the vulcanizing operation.

Referring to Fig. 1, the tire casing 1 with the new tread 2 and interposed layer 3 of fresh rubber are there shown properly arranged for the vulcanization of such layer of fresh rubber. To this end the old tire casing 1 is mounted on a rim 4, preferably a demountable rim of the sort ordinarily used on automobiles of the present day, in order to avoid the necessity of handling the wheel which would constitute merely an incumbrance. The inner tube 10 is disposed in place within the casing or shoe ready to be inflated as hereinafter described. Before placing the new tread upon such casing, a layer of fresh rubber is applied about the entire circumference of the old casing in the usual fashion, the sheet of rubber used for this purpose being of a sufficient width to extend transversely of the casing approximately from the bead on the one side thereof to that on the other.

It is to the special means provided for heating this layer of fresh rubber that attention is directed, such means consisting of suitable electric resistance elements so disposed and arranged that this layer may be directly and uniformly heated throughout practically its entire extent, and the vulcanization of the sheet in question to the opposed surfaces of the casing and tread be thus accomplished without applying heat externally to either of the latter. Preferably I utilize for the resistance elements in question a series of short strands 5 of relatively fine wire, disposing the same transversely of the sheet of fresh rubber and connecting their respective ends to continuous conductors 6 and 7, consisting of heavier wires. I preferably use two series of such wires 5, one series being thus applied to each side of the sheet, as shown best in Fig. 2, one of the two heavier wires acting as a lead, and one acting as return as shown in Fig. 3. I may also arrange the transverse wires 5 composing the respective series, in crisscross relation to each other as shown in Fig. 4.

In the assembled condition of parts shown in Fig. 1, the conductors 6 and 7 will be bent into circular form and lie adjacent to the edges of the rim on each side of the casing, one end of each projecting and being adapted to be connected in series with a suitable current supply, so that such current may be caused to pass through the transverse wires that lie in contact with the sheet of rubber, as will be readily understood.

The next step consists in wrapping or winding a tape 8 or the like around the rim, casing and tread, so that upon inflation of the inner tube the casing and tread will be pressed together under a proper degree of pressure. Thereupon current is passed through the conductors and transverse wires as previously described, with the result that the sheet of fresh rubber is quickly and uniformly vulcanized, thereby firmly uniting the casing and tread together. As soon as such vulcanization has been completed, the wrapping is removed and the transverse strands cut or trimmed off close to the side of the casing so as to present a finished appearance, and the operation is then complete.

It will be understood that a sectional mold of suitable form may be utilized to hold the tread against expansion when pressure is applied within the casing by inflating the inner tube instead of utilizing the wrapping described above. It will also be understood that the number and size of the wire strands which serve as the electric heating elements will be gaged to suit the requirements of the particular case, and that the current utilized will also be varied, depending upon the character of these strands and the expedition with which it is desired to carry out the process. By means of the foregoing improved method and apparatus, not only do I achieve the desired result of directly and uniformly vulcanizing the particular part of the composite structure which requires to be thus treated, without affecting the condition of the other parts, but the embedded wires utilized in this connection provide an additional highly desirable reinforcement for the structure. Particularly where they are criss-crossed in the fashion illustrated in Fig. 4, they constitute in effect a wire mesh reinforcement extending entirely around the renovated casing.

While I have described my improved method and apparatus as applied to a particular use, it will be understood that they are equally adaptable for a variety of uses where a similar result is sought, and may be employed with equally satisfactory results in the manufacture of articles *de novo*, as in repairing worn ones.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. In a method of vulcanizing rubber, the steps which consist in forming an electric heating element in contact with a layer of fresh rubber, placing such layer and such element in contact with the parts to be vulcanized together, and then passing a heating current through such heating element.

2. In a method of vulcanizing rubber, the steps which consist in forming an electric heating element in contact with a relatively thin layer of fresh rubber, placing such layer between the parts to be vulcanized, pressing such parts into close contact with such layer, and then passing a heating current through such element.

3. In a method of vulcanizing rubber, the steps which consist in forming an electric heating element in contact with a relatively thin layer of fresh rubber, placing such layer between the parts to be vulcanized, wrapping such three parts to maintain the same in close contact with each other, and then passing a heating current through said element.

4. In a method of vulcanizing rubber, the steps which consist in forming heating elements on and in contact with both faces of a layer of fresh rubber, placing such formed layer and elements between the parts to be combined, and then passing a heating current through such elements.

5. In a method of vulcanizing rubber, the steps which consist in forming heating elements on and in contact with both faces of a layer of fresh rubber, placing such formed elements and said layer between the parts to be combined, wrapping such parts to maintain such heating elements in contact with such layer and such parts and then passing a heating current through such elements.

6. In a method of vulcanizing tire treads to casings, the steps which consist in forming a heating element in contact with a layer of fresh rubber, placing such layer between the casing and the tire tread, and then passing a heating current through such element.

7. In a method of vulcanizing tire treads to casings, the steps which consist in forming a heating element on and in contact with both faces of a relatively thin layer of fresh rubber, placing such layer and such elements between the casing and the tire tread, wrapping the whole to maintain the casing and tread in close contact with such rubber and such element, and then passing a heating current through such element.

8. In a method of vulcanizing tire treads to casings, the steps which consist in forming an electric heating element embedded in a layer of fresh rubber, placing such layer between the tire tread and casing, and then passing a heating current through such element.

9. In a method of vulcanizing tire treads to casings, the steps which consist in forming an electric heating element embedded in a layer of fresh rubber, placing such layer between the tire tread and casing, wrapping said tread, layer and casing to hold the same together under pressure, and then passing a current through such heating element.

Signed by me, this 14th day of February, 1916.

WILBUR B. BURKE.

Attested by—
 THOMAS H. FAY,
 OLIVER M. KAPPLER.